United States Patent [19]

Brethorst

[11] Patent Number: 5,042,392
[45] Date of Patent: Aug. 27, 1991

[54] FLOOR MOUNTED WALKING BEAM SYSTEM FOR ADVANCING A VEHICLE

[75] Inventor: David Brethorst, Lodi, Wis.

[73] Assignee: DEC International, Inc., Madison, Wis.

[21] Appl. No.: 473,221

[22] Filed: Jan. 31, 1990

[51] Int. Cl.⁵ .................. B61B 13/12; B61B 13/00
[52] U.S. Cl. .................................... 104/162; 198/747
[58] Field of Search .............. 104/27, 29, 162, 165, 104/169; 198/746, 747

[56] References Cited

U.S. PATENT DOCUMENTS

| | | | |
|---|---|---|---|
| 757,732 | 4/1904 | Fitch | 104/162 |
| 1,646,901 | 10/1927 | Denison | 104/162 |
| 2,421,690 | 6/1947 | Ensor et al. | 104/162 |
| 3,767,064 | 10/1973 | Lutz | 198/747 |
| 3,882,792 | 5/1975 | McIntier | 104/162 |
| 3,986,605 | 10/1976 | Dooley et al. | 198/746 |
| 3,993,000 | 11/1976 | Sherwood | 104/162 |
| 4,039,075 | 8/1977 | Gray | 104/162 |
| 4,860,663 | 8/1989 | Maruse et al. | 198/747 |

*Primary Examiner*—Robert J. Oberleitner
*Assistant Examiner*—S. Joseph Morano
*Attorney, Agent, or Firm*—Andrus, Sceales, Starke & Sawall

[57] ABSTRACT

A system for intermittently advancing floor-supported vehicles through a food product processing system employs beam members mounted adjacent the floor which are reciprocably movable back and forth, preferably in response to extension and retraction of the rod of a cylinder. Engagement members, preferably in the form of upstanding trip dogs provided on the beams, engage the underside of the vehicles for drawing the vehicles through the cabinets of the processing system. A system is provided for transferring the vehicles from one walking beam assembly to another.

10 Claims, 6 Drawing Sheets

FLOOR MOUNTED WALKING BEAM SYSTEM FOR ADVANCING A VEHICLE

BACKGROUND AND SUMMARY

This invention relates to food processing, and more particularly to an apparatus and method for advancing a food product through one or more processing chambers, with the product being carried by a floor-supported vehicle.

In a food processing facility, such as a facility for producing smoked meat products or the like, various systems are known for arranging the processing chambers to facilitate processing of the product. One such system is a continuous processing system in which the various cabinets are linearly arranged, and the product moved linearly through the cabinets from an inlet end to an outlet end. The system includes various processing cabinets, such as a smoking cabinet, one or more cooking or heating cabinets, and a chill cabinet.

Many operators of processing facilities utilize wheeled or other floor-supported product carrying vehicles for carrying the product to and from the processing cabinets. Use of such vehicles allows the operator to utilize substantially the entire floor space of the facility for moving the product as necessary, and is also relatively inexpensive, avoiding the rigidity and attendant cost of an overhead transport system.

In the past, product movement through a continuous processing system has been accomplished by an overhead walking beam conveyor system. In a facility in which the product is moved about by means of floor-supported vehicles, it has been necessary to elevate the product vehicle off the plant floor and onto overhead conveyor system for movement through the continuous processing system. Upon discharge of the vehicle from the processing system, the vehicle was deelevated off of the overhead system and back onto the plant floor, for transport to subsequent processing stations.

The present invention has as its object to accommodate use of floor-supported vehicles in a processing facility, and to allow use of the vehicles to advance the product through the processing cabinets without having to elevate product carrying vehicles onto an overhead rail at the inlet to the processing cabinets and thereafter subsequently deelevating the product carrying vehicle back onto the plant floor at the outlet.

In accordance with the invention, a system for incrementally advancing a floor-supported vehicle comprises a longitudinally movable beam mounted adjacent the floor, and reciprocating means for reciprocating the beam in a first direction and in a second direction. Engagement means is interposed between the beam and the vehicle for engaging the beam with the vehicle during movement of the beam in the first direction for incrementally advancing the vehicle. Upon reciprocation of the beam in the second direction, the engagement means is movable to a non-engaging position for preventing movement of the vehicle in the second direction. In a preferred embodiment, the beam is supported for longitudinal movement by a plurality of spaced rollers or other suitable means allowing support above the floor, and the rollers are supported above the floor. The reciprocating means preferably comprises an hydraulic or pneumatic cylinder with an extendable and retractable piston rod, with the beam being mounted to the rod for reciprocating movement. The engagement means preferably comprises a series of spaced engagement members movably mounted to the beam. The engagement members are pivotably mounted to the beam and are normally disposed in an engaging position for advancing the vehicle during movement of the beam in the first direction. Upon movement of the beam in the second direction, the engagement members are pivotable to a non-engaging position. Subsequent movement of the beam in the first direction causes the engagement members to once again engage the vehicle for moving the vehicle in the first direction. The engagement members are equally spaced on the beam for providing equal incremental advancement of the vehicles. The pivoting movement of the engagement members to their non-engaging position is preferably caused by contact of the engagement members with the vehicle during movement of the beam in the second direction.

In an arrangement for processing a food product, one or more processing chambers are provided, each performing a separate processing operation on the product. A plurality of floor-supported vehicles, carry the product, and an advancement for incrementally advancing the vehicles through the chambers is provided substantially in accordance with the foregoing summary. In a preferred embodiment, the beam comprises one or more movable beam sections. With multiple beam sections, the sections are arranged so as to allow overlapping orientation of one section with respect to its adjacent section, with the engagement members being provided on the overlapping areas. In this manner, the vehcles are transferred from one beam section to another for advancing the vehicles completely through the system.

In accordance with another aspect of the invention, a method of incrementally advancing a floor-supported vehicle carrying a food product through one or more processing chambers is provided, substantially in accordance with the foregoing summary.

BRIEF DESCRIPTION OF THE DRAWINGS

The drawings illustrate the best mode presently contemplated of carrying out the invention.

In the drawings.

DETAILED DESCRIPTION OF THE PRIOR ART

Figures 1, 2:
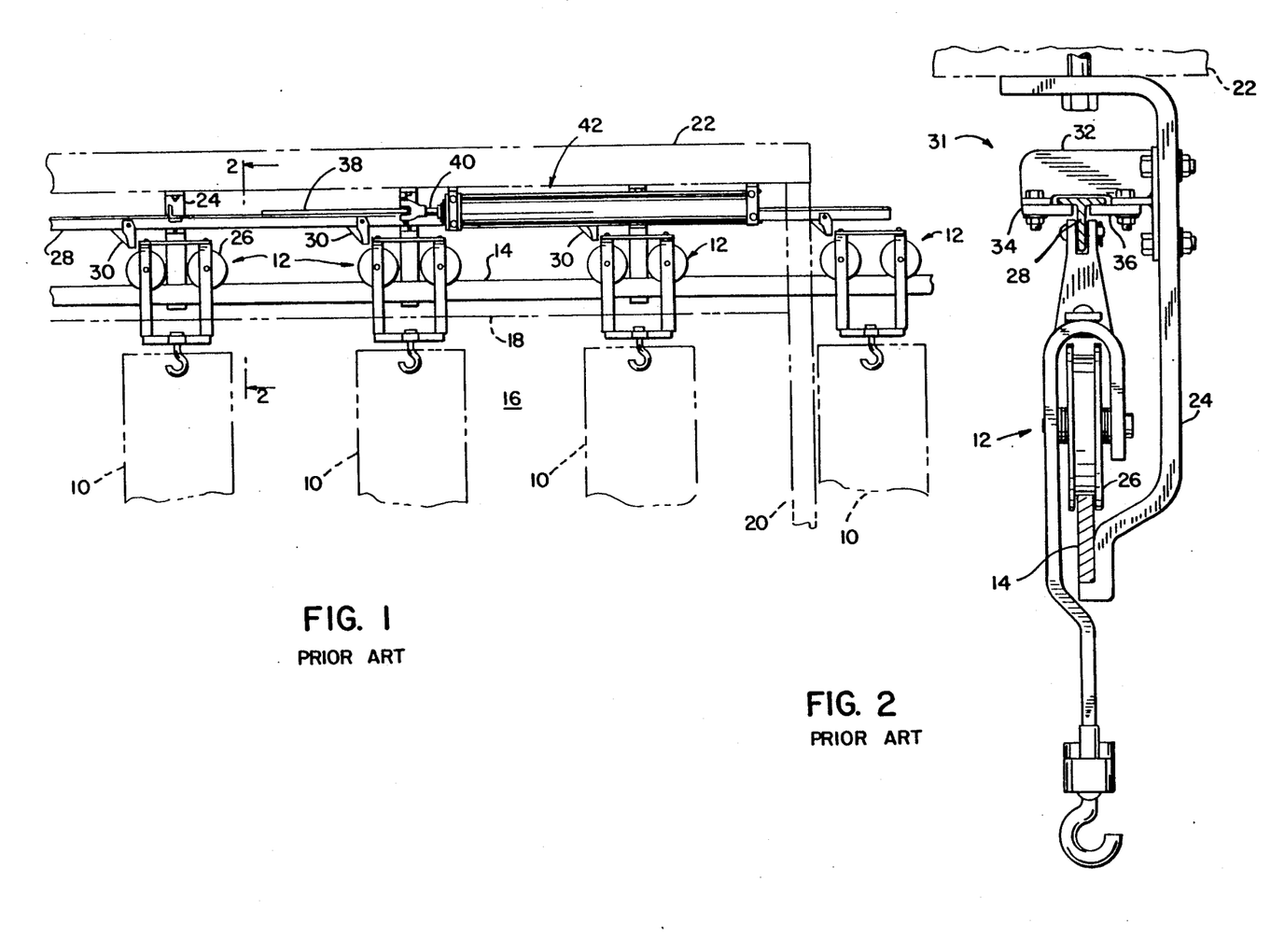
FIG. 1 is a side elevation view of a prior art overhead trolley walking beam advancement arrangement.
FIG. 2 is a partial sectional view, reference being made to line 2—2 of FIG. 1.

With reference to FIG. 1, a prior art overhead trolley advancement system is illustrated. In this system, a series of product trees, shown at 10, are carried by a series of trolley assemblies, shown generally at 12, which are mounted to a rail 14. Trees 10 are shown as being transported through a processing chamber 16 defined in part by a false ceiling 18 and an end panel 20, which supports a top panel 22. As shown in FIG. 2, rail 14 is suspended from top panel 22 by means of a rail hanger 24. Trolley 12 has a pair of wheels, one of which is shown at 26, which ride on top of rail 14.

As a means for advancing trollies 12 and product trees 10 through chamber 16, a T-shaped linkage bar 28 is supported in the space between top panel 22 and false ceiling 18, and a series of drop fingers 30 are mounted to linkage bar 28. As shown in FIG. 2, a linkage support subassembly 31 is connected to each of rail hangers 24, for movably supporting likage bar 28. Subassembly 31 includes a suppport member 32 to which a pair of spaced lower support plates 34, 36 are mounted. A space is defined between support plates 34, 36. Additionally, a space is defined between the upper surface of support plates 34, 36 and the lower interior surface of support member 32. This arrangement is adapted to receive the upper cross-member and the vertical leg of T-shaped linkage bar 28 as shown, thus allowing longitudinal movement of linkage bar 28 relative to rail hangers 24.

Linkage bar 28 is connected to a linkage arm 38, which is mounted by means of a clevis assembly to an extendable and retractable piston rod 40 associated with a fluid-operated cylinder, shown generally at 42.

Drop fingers 30 are mounted to linkage bar 28 so as to be normally disposed in an engaging position in which the forward face of each drop finger 30 engages the rearward surface of each trolley 12 during forward movement of linkage bar 28, caused by retraction of piston rod 40 within cylinder 42. When piston rod 40 is extended, drop fingers 30 pivot to a non-engaging position due to contact of a ramped surface provided on each drop finger with the forward end of each trolley 12. Upon continued rearward movement of linkage bar 28, the drop fingers pass over the trolley 12, and resume their engaging position as shown. When piston rod 40 is again retracted, the drop fingers 30 are drawn forwardly so as to once again engage the rearward surface of a trolley 12, and continued retraction of piston rod 40 causes advancement of trollies 12 the length of the piston storke. This cycle is continuously intermittently repeated for advancing the product trees through processing chamber 16.

DETAILED DESCRIPTION OF THE PREFERRED EMBODIMENT

Figure 3:
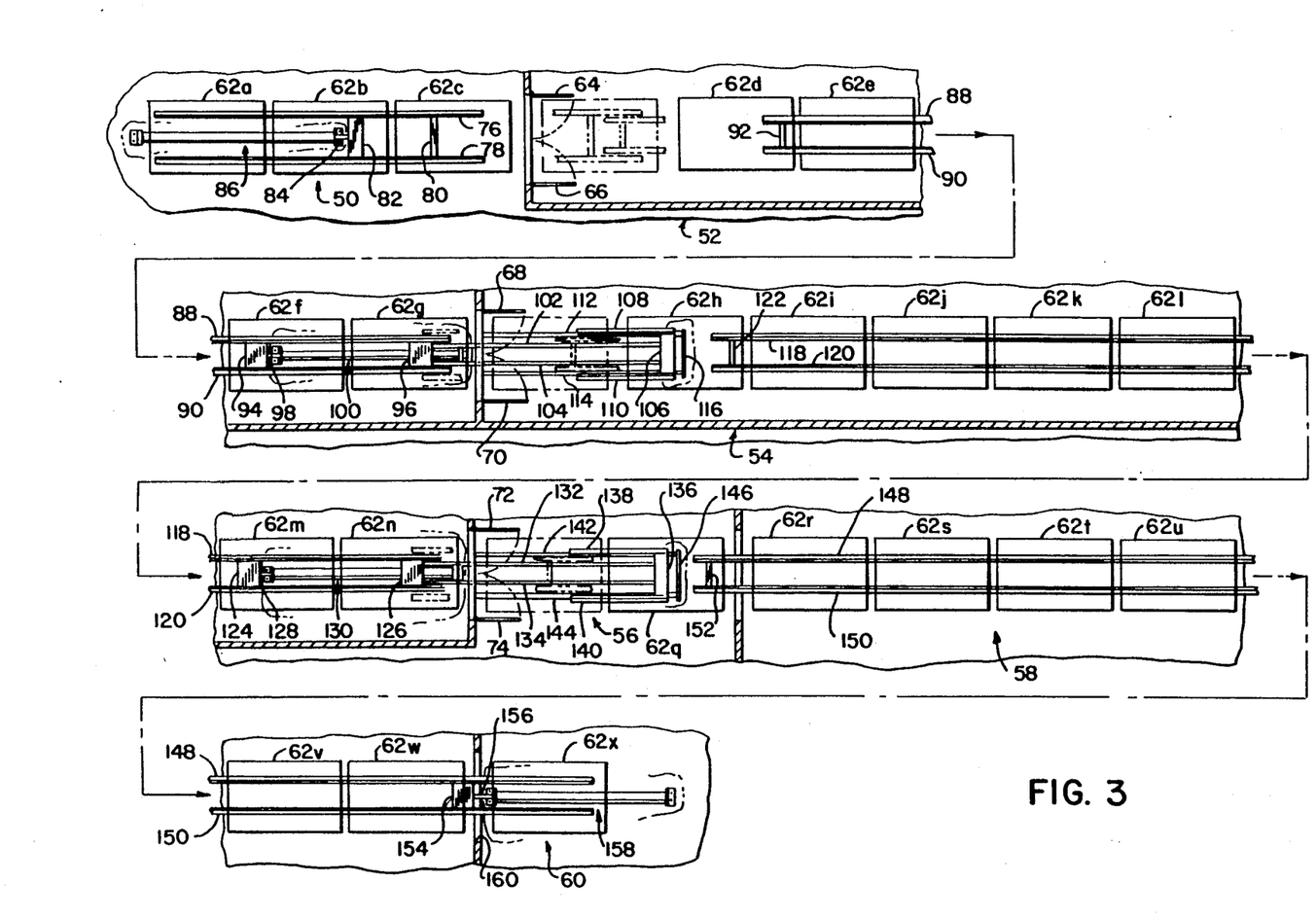
FIG. 3 is a plan view of the floor-mounted walking beam advancement system of the invention, shown in connection with, one lane of a multi-chamber continuous processing system.

With reference to FIG. 3, a continuous inline food processing arrangement is illustrated in which floor-mounted vehicles are utilized for moving the food product through the various processing chambers. As shown, the arrangement incudes a staging area shown generally at 50, a first cooking cabinet 52, a second cooking cabinet 54, a void area 56, a chill cabinet 58, and a discharge area 60. Cabinets 52, 54 and 58 are shown broken away. In a preferred embodiment, a lane parallel to the illustrated lane for moving the product through the various areas of the processing system is provided for more efficiently utilizing the cabinet volume. It is to be appreciated, of course, that any number of lanes may be provided in a processing cabinet for advancing the vehicles therethrough.

In FIG. 3, the vehicles on which the product is carried are represented by rectangular boxes over the advancement system. As shown, vehicles 62a, 62b and 62c are located at staging area 50. The rearmost vehicle in first cooking cabinet 52 is shown in solid lines at 62d. Vehicle 62d is illustrated in phantom in a position as it is being drawn through the openable doors 64, 66 of cabinet 52. The remaining vehicles in cooking cabinet 52 are shown at 62e, 62f and 62g. Vehicles 62h–62n are shown in second cooking cabinet 54, and a vehicle 62q is shown in solid lines in void area 56. The phantom line representation behind vehicle 62q represents vehicle 62q as it is exiting cooking cabinet 54 and entering void area 56.

Vehicle 62h is illustrated in solid lines in the rearwardmost position of cooking cabinet 54, and the phantom line representation behind vehicle 62H is of vehicle 62h as it is exiting first cooking cabinet 52 through its openable doors 68, 70 and entering second cooking cabinet 54.

Openable doors 72, 74 are provided at the discharge of second cooking cabinet 54 for allowing passage of a vehicle into void area 56.

Vehicles 62r–62w are illustrated as being within chill cabinet 58, and a vehicle 62x is illustrated at discharge area 60.

At staging area 50, a walking beam system for advancing vehicles 62a–62c toward cabinet 52 generally includes a pair of parallel beam members 76, 78, between which are connected a cross-member 80 and a plate member 82. Plate member 82 is connected through clevis pin arrangement to a rod 84 associated with a cylinder 86, mounted adjacent the floor.

Cooking cabinet 52 is also provided with a walking beam structure for advancing vehicles therethrough, consisting of a pair of parallel beam members 88, 90 between which extend a cross-member 92 and a pair of plate members 94, 96. A rod 98 associated with a cylinder 100 is connected through a clevis pin arrangement to the underside of plate 94. A pair of shafts 102, 104 are connected between the underside of plate 96 and the underside of a plate 106, which extends between a pair of rail members 108, 110. Rail members 108, 110 are slideably supported on pair of shafts 112, 114, respectively, which extend between the rear wall of cabinet 54 and a vertically mounted plate 116.

As shown in phantom in the upper portion of FIG. 3, the forward ends of staging area rail members 76, 78 are movable to a forward position upon extension of rod 84 through doors 64, 66 into the loading station of cabinet 52, shown in phantom. First cabinet rail members 88, 90 are movable rearwardly within cabinet 52 to a rearwardmost position in which the rear ends of rail members 88, 90 are telescopingly received within the space between staging area rail members 76, 78. This action occurs upon extension of rod 98 associated with cylinder 100. In a manner to be explained, this overlapping of rail members 76, 78 and 88, 90 allows the walking beam system of cabinet 52 to pick up the vehicle advanced through doors 64, 66 by the staging area walking beam system to the load station, for moving the vehicle to its rearwardmost position within cabinet 52, shown at 62d.

As shown in phantom at the forward end of cabinet 52, rails 108, 110 are movable to a rearwardmost position in which they are disposed beneath vehicle 62g upon extension of rod 98. In a manner to be explained, subsequent retraction of rod 98 causes engagement between rails 108, 110 and vehicle 62g, drawing vehicle 62g through doors 68, 70 and into the receiving area of cabinet 54.

Cabinet 54 is provided with a walking beam advancement system identical in principle to that provided in cabinet 52, consisting of a pair of rails 118, 120 between which are connected a cross member 122 and a pair of plates 124, 126. A rod 128 associated with a cylinder 130 is connected through a clevis pin arrangement to the underside of plate 124. A pair of shafts 132, 134 extend between the underside of plate 126 and a plate 136, and a pair of rails 138, 140 are movable on a pair of shafts 142, 144 extending between the end wall of cabinet 54 and a vertical plate member 146 located in void area 56. Rails 138, 140 are movable to a rearwardmost shown in phantom lines at the forward end of cabinet 54 upon extension of rod 128, overlapping vehicle 62n. Subsequent retraction of rod 128 causes engagement between rails 138, 140 and vehicle 62n for drawing it through doors 72, 74 when open, to a receiving area associated with void area 56.

Also upon extension of rod 128, the rearwardmost end of rails 118, 120, telescopingly moves between rails 108, 110, as shown in phantom. This overlapping allows engagement between rails 118, 120 and the vehicle moved through the open doors 68, 70 by rails 108, 110, and subsequent advancement of the vehicle into the rearward most position of cabinet 54, shown at 62h.

A final walking beam type assembly for moving the vehicles from void area 56 and into chill cabinet 58 includes a pair of rails 148, 150, between which is connected a cross member 152 and a plate member 154. A rod 156 associated with a cylinder 158 is connected through a clevis pin arrangement to the underside of plate 154. Upon extension of rod 156, rails 148, 150 are moved rearwardly into telescoping relationship between rails 138, 140, as shown in phantom. This overlapping of rails 148, 150 with rails 138, 140 allows engagement between rails 148, 150 and the vehicle drawn through doors 72, 74 by rails 138, 140, and subsequent retraction of rod 156 advances the vehicle from the receiving area of void area 56 to the station just prior to entry into chill cabinet 58, shown at 62g. Such retraction of rod 156 also results in drawing the forwardmost vehicle through the discharge opening, such as shown at 160, formed in the forward wall of chill cabinet 58. This vehicle is shown at 62x, which is then moved to a subsequent processing area after discharge from chill cabinet 58.

Figure 4:
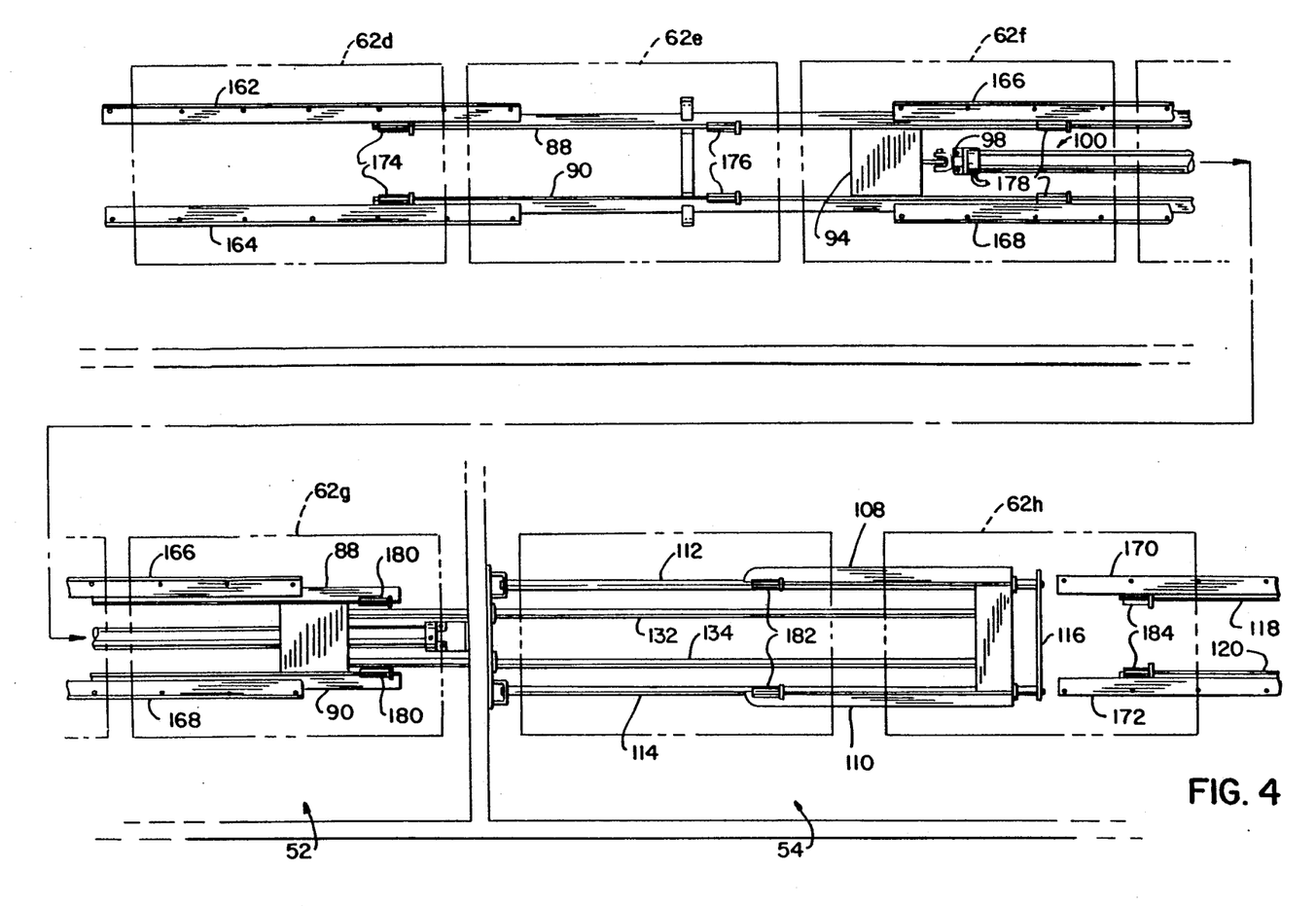
FIG. 4 is, an enlarged plan view of a portion of the system shown in FIG. 3.

Referring now to FIG. 4, cooking cabinets 52 and 54 are again illustrated in an enlarged plan view. A series of floor-mounted rail supports 162, 164, 166 and 168 are provided for supporting rails 88, 90. Similarly, supports 170, 172 provide support for rails 118, 120.

A series of trip dogs, shown in pairs at 174, 176, 178 and 180, are mounted on rails 88, 90. Likewise, a pair of trip dogs 182 are mounted to rails 108, 110, and a pair of trip dogs 184 mounted to rails 118, 120. As will be explained, the pairs of trip dogs 174-184 engage the underside of a vehicle carrying the food product during retraction of the rods, such as 98, associated with the cylinders, such as 100, for advancing the vehicles from station to station through the processing system. Upon extension of the rods, trip dogs 174-184 are moved to a non-operative position so as not to move the vehicles during rod extension.

Figure 5:
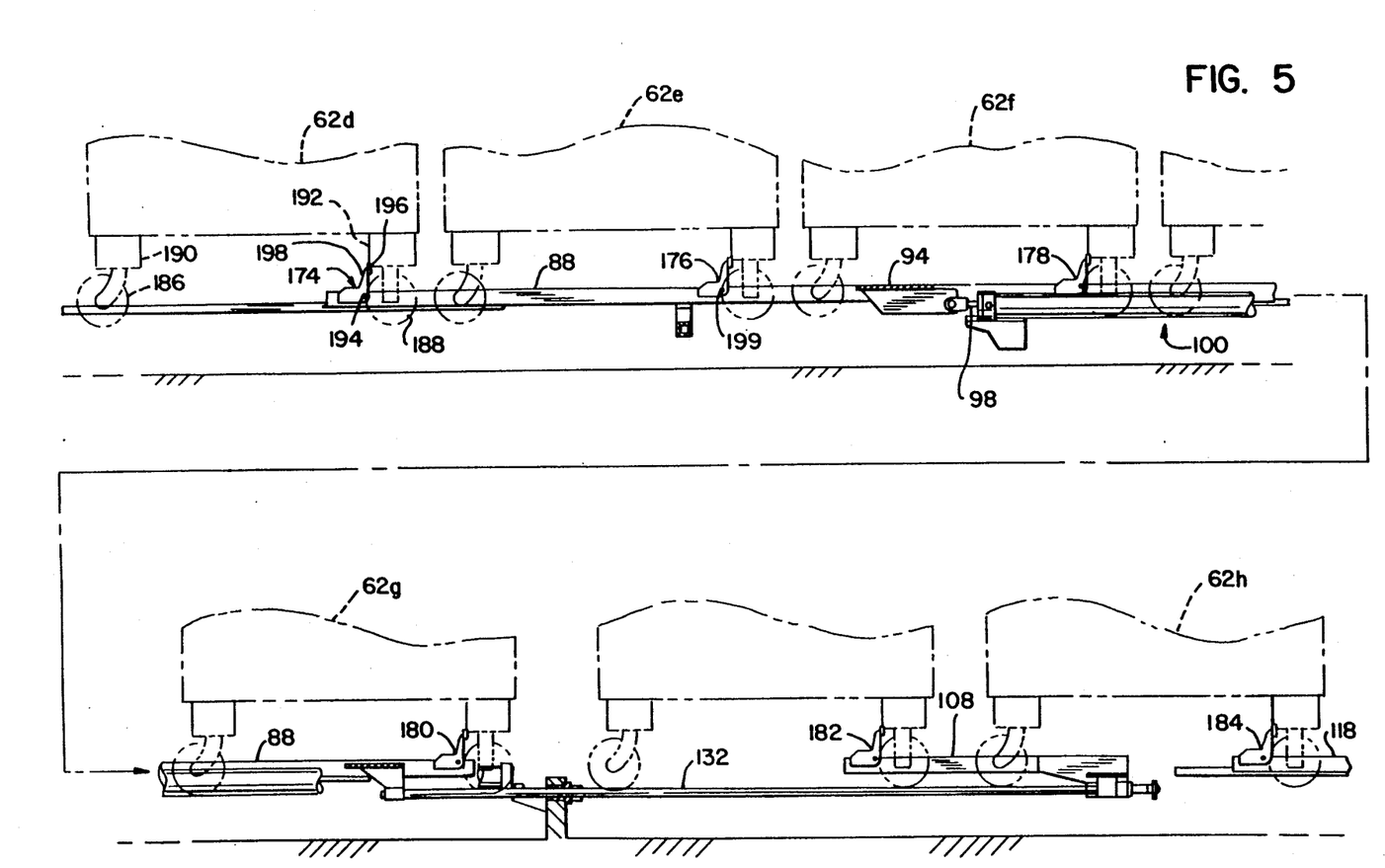
FIG. 5 is a partial side elevation view showing the floor-mounted system of FIGS. 3 and 4.

Reference is now made to FIG. 5, which illustrates schematically a section view through the stations shown in FIG. 4. As shown, vehicle 62d includes a pair of rear wheels 186 and a pair of front wheels 188. Bracket members 190, 192 extend between the underside of vehicle 62d and wheels 186, 188, respectively. Vehicles 62e-62h are similarly constructed.

Trip dogs 174-184 are identical in construction and operation, and will be described briefly with reference to trip dog 174. Trip dog 174 is pivotably mounted to rail 88 by a pin 194 and is normally disposed in an operative position, as shown. Trip dog 174 includes a pusher plate 196 at its front top face, and a cam surface 198 is formed on the rear upstanding face of trip dog 174. When trip dog 174 is in its operative position as shown, pusher plate 196 is at an elevation so as to engage the rear face of bracket 192 upon retraction of rod 98 of cylinder 100. This results in moving of vehicle 62d forwardly until rod 98 is fully retracted. The same holds true for trip dogs 176-184, which act to move vehicles 62e-62h forwardly. The vehicles remain in this position a predetermined time, and cylinder 100 is then actuated so as to extend rod 98.

Upon extension of rod 98, the trip dogs mounted to beams 88, 90 are moved rearwardly. When this occurs, for example, trip dog 176 is moved to a position below vehicle 62d. When trip dog 176 is moved into contact with bracket 192, its cam surface engages bracket 192 for pivoting trip dog 176 about its pivot pin, shown at 199, to an inopertive position for preventing rearward movement of vehicle 62d. Once trip dog 176 clears bracket 192, the weight of its horizontal leg pivots trip dog 176 back to its operative position in preparation for retraction of rod 98, for moving vehicle 62d forward another increment.

Figure 6:
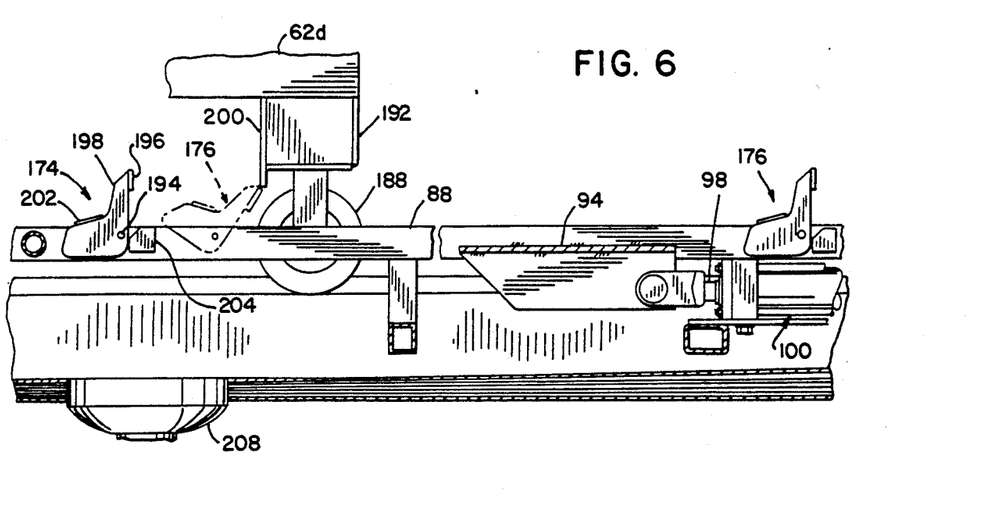
FIG. 6 is an enlarged detailed side view showing the interaction between one of the engagement members and a of the vehicle.
Figure 7:
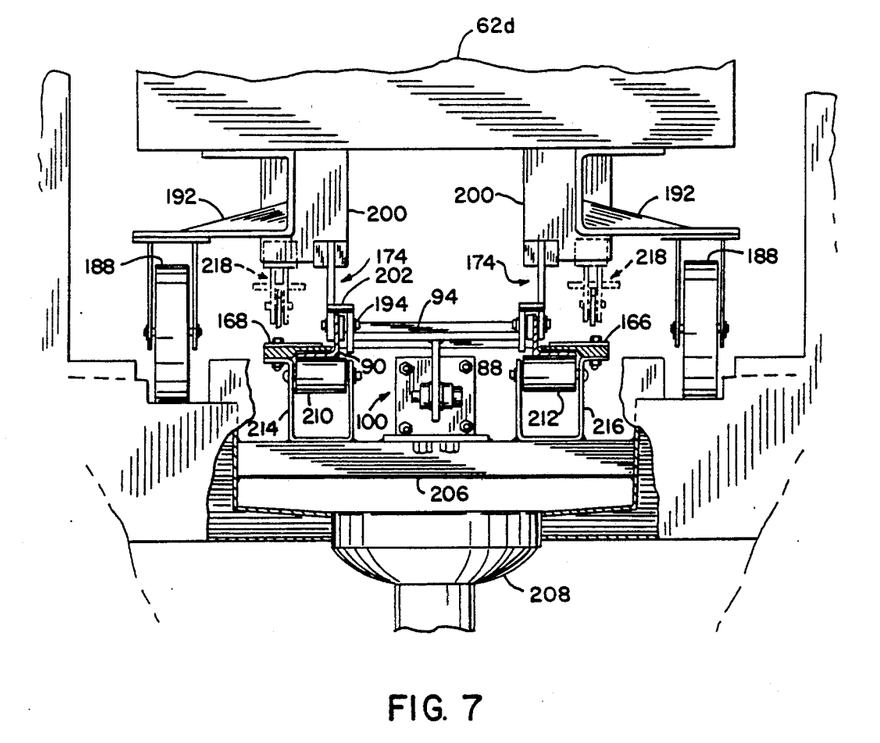
FIG. 7 is an end elevation view, with portions in section, showing the walking beam advancement system and its position relative to the underside of a vehicle.

FIGS. 6 and 7 illustrate in greater detail the interaction between the trip dogs and the vehicles. As shown, a plate 200 is connected at the rear face of bracket 192, and is adapted to be engaged by pusher plate 196 provided on trip dog 174. When trip dog 174 is in its upright operative position, shown in solid lines in FIG. 6, and rod 98 of cylinder 100 retracted so as to cause rightward movement of beam 88, a bar 202 mounted to the leg of trip dog 174 and extending between trip dog 174 and its companion trip dog mounted to beam 90, engages the upper surface of beam 88 for maintaining trip dog 174 in its upright position.

Trip dog 176 is shown in phantom in FIG. 6 during extension of rod 98 and rearward movement of beam 88, with its cam surface engaging the lower edge of plate 200 mounted to bracket 192. This pivots trip dog 176 about its mounting pin 199 to its inoperative position for preventing leftward movement of vehicle 62d during rod extension. A stop block 204 is provided for preventing excessive clockwise pivoting of the trip dogs 174 about their pivot pins 194. The above-described steps are repeated so as to intermittently draw the vehicles through the processing system.

Referring to FIG. 7, it is seen that a support member 206 extends between facing walls of a drainage channel, fitted with a floor drain 208. A series of spaced rollers, such as shown at 210, 212 are rotatably supported by a series of brackets such as shown at 214, 216, respectively, extending above the support members such as 206. Beams 90, 88 ride atop rollers 210, 212, respectively for accommodating longitudinal back and forth movement of beams 88, 90. The rollers are spaced so as to provide adequate support throughout the length of beams 88, 90. FIG. 7 also illustrates in phantom a pair of trip dogs 218 mounted to a pair of beams adapted to receive beams 88, 90 telescopingly therebetween, which accommodates transfer of a vehicle from one walking beam assembly to another. The offset of the trip dogs is a sufficient distance to provide clearance between the trip dogs, but allowing engagement of both the inside and outside trip dogs with plate 200.

The foregoing description clearly illustrates the advantage offered by the present invention in allowing use of wheeled vehicles for moving product through a processing system, with little or no adaptation needed to fit the vehicles for such use.

It is to be appreciated that the system of the invention is not limited to use with wheeled vehicles, and may be used with vehicles mounted on skids or any other satisfactory means by which vehicles are moved about.

Figure 8:
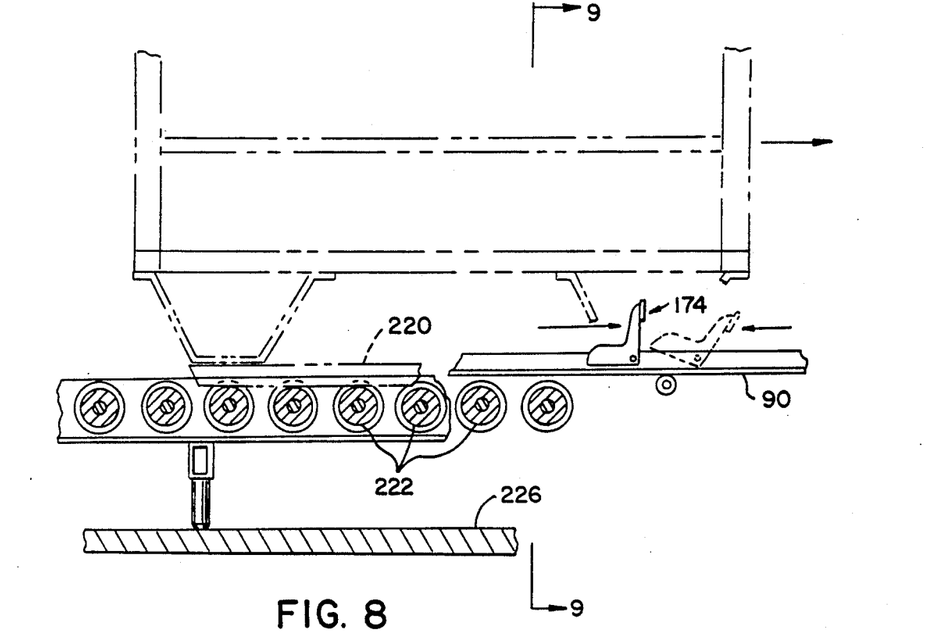
FIG. 8 is a view similar to FIG. 6, showing another embodiment of the invention in which the vehicle is supported by skids.
Figure 9:
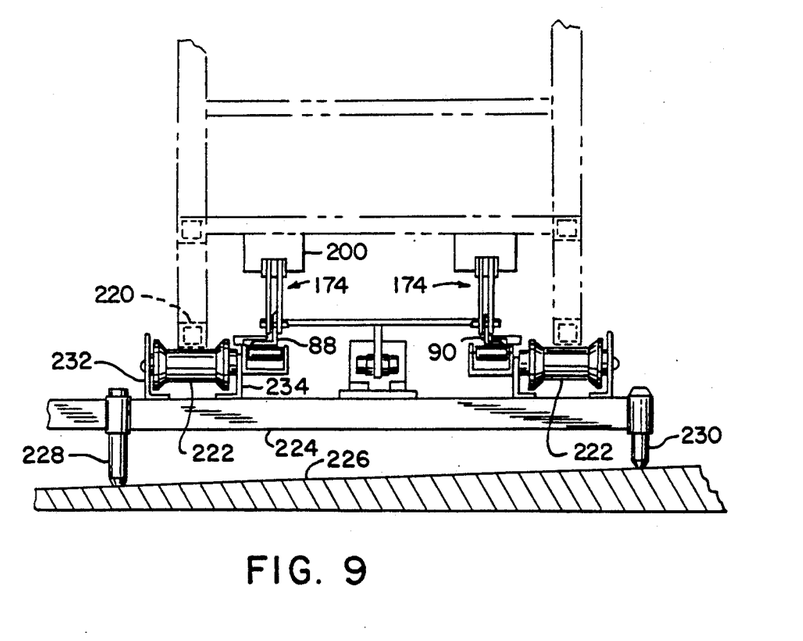
FIG. 9 is a section view taken generally along line 9—9 of FIG. 8.

FIGS. 8 and 9 illustrate this type of a system, in which each vehicle is provided with a pair of longitudinal skids, such as 220, which support the vehicle in place of the wheels, as described previously. Like reference characters will be used where possible to facilitate clarity. In this type of system, the beams 88, 90 to which trip dogs 174 are mounted, are movable back and forth in a manner similar to that described previously. In this instance, however, a series of rollers 222 are rotatably mounted above a support member 224, spaced above the floor of the cabinet, shown at 226, by a pair of supports 228, 230. Each of rollers 222 is supported between a pair of angle members, such as shown at 232, 234, mounted to the top of support member 224. Rollers 222 are spaced at regular intervals along angle supports 232, 234, and a plurality of rollers 222 are constantly in contact with the skids such as 220 for supporting the vehicle above the floor.

With this construction, when beams 88, 90 are moved so as to engage trip dogs 174 with plate 200 mounted to the underside of the vehicle, the skids, such as 220, of the vehicle are moved on top of the rollers 222 for advancing the vehicle through the processing cabinet.

Various alternatives and embodiments are contemplated as being within the scope of the following claims particularly pointing out and distinctly claiming the subject matter regarded as the invention.

I claim:

1. A floor-mounted walking beam system for incrementally advancing one or more floor-supported vehicles, comprising:
   an upstream beam section and a downstream beam section;
   reciprocating means for reciprocably moving the beam sections in a first direction and a second direction;
   wherein said beam sections are arranged such that the extent of movement of one of the beam sections in one direction overlaps the extent of movement of an adjacent beam section in the other direction; and
   engagement means interposed between the beam sections and the vehicles for engaging the vehicles during movement of the beam sections in one direction for advancing the vehicles, said engagement means being movable to an inoperative non-engaging position during movement of the beam sections in the other direction for preventing movement of the vehicles, said engagement means being located on the overlapping area of the extent of movement of said beam sections;
   wherein the reciprocating means provides independent reciprocable movement of the upstream and downstream beam sections for selectively placing the extent of movement of the beam sections in overlapping relation with each other, to provide transfer of the vehicles from the upstream beam section to the downstream beam section.

2. The system of claim 1, wherein the beam sections are supported by a plurality of spaced rollers.

3. The system of claim 2, wherein the rollers are supported above a floor, and wherein the beam systems are movable on the rollers.

4. The system of claim 1, wherein the reciprocating means comprises a cylinder having an extendable and retractable piston rod, and wherein one of the beam section is mounted to the piston rod.

5. The system of claim 1, wherein said engagement means comprises a series of engagement members movably mounted to each beam section.

6. The system of claim 5, wherein the engagement members are pivotably mounted to the beam sections, and are normally disposed in an engaging position and are movable to the non-engaging position upon movement of the beam sections in said second direction.

7. The system of claim 6, wherein pivoting movement of the engagement members is caused by contact of the engagmeent members with the vehicle during movement of the beam sections in said second direction.

8. A processing arrangement for a food product in which a plurality of floor-supported vehicles each carry the product, comprising:
   a plurality of processing chambers arranged substantially along a common longitudinal axis and being disposed adjacent each other with the outlet of one chamber being located adjacent the inlet of the chamber downstream therefrom, wherein a separate processing operation is performed on the product in each chamber; and
   an advancement system for incrementally advancing the plurality of vehicles through the processing chambers, comprising:
     longitudinally movable beam means mounted adjacent the floor of the processing chambers;
     reciprocating means for reciprocably moving said beam means in a first direction and in a second direction; and
     engagement means interposed between the beam means and the vehicles for engaging the beam means with the vehicles during movement of the beam means in the first direction for incrementally advancing the vehicles, the engagement means being movable to a non-engaging position during movement of the beam means in said second direction for preventing movement of the vehicles in said second direction;
   wherein the beam means includes an arrangement for moving vehicles from one chamber downstream therefrom and comprises an upstream moveable beam section and a downstream movable beam section, each section being constructed so as to allow overlapping orientation with the extent of movement of the other beam section, and wherein the reciprocating means provides independent reciprocable movement of each beam section in overlapping relation with the extent of movement of the other beam section, for accommodating transfer of a vehicle from one processing chamber of the adjacent downstream processing chamber.

9. The arrangement of claim 8, wherein the engagement means comprises a plurality of engagement members on each beam section, with the extreme downstream engagement member on the upstream beam section overlapping the extreme upstream engagement member on the downstream beam section when the beam sections are moved such that the extent of movement of the beam sections are placed into overlapping relation.

10. The arrangement of claim 9, wherein the beam sections are disposed at substantially the same elevation throughout the processing chambers, and are constructed so as to provide telescoping of adjacent beam sections for accommodating transfer of vehicles from one processing chamber to another.

* * * * *

UNITED STATES PATENT AND TRADEMARK OFFICE
CERTIFICATE OF CORRECTION

PATENT NO. : 5,042,392
DATED : August 27, 1991
INVENTOR(S) : DAVID BRETHORST

It is certified that error appears in the above-identified patent and that said Letters Patent is hereby corrected as shown below:

Claim 3, Col. 8, Line 11:
Delete "systems" and substitute therefor -- sections --.

Signed and Sealed this

Seventeenth Day of November, 1992

Attest:

DOUGLAS B. COMER

*Attesting Officer*    *Acting Commissioner of Patents and Trademarks*